UNITED STATES PATENT OFFICE.

GEORGE C. LYMAN, OF NEW YORK, N. Y.

PROCESS OF DISSOLVING COPAL GUMS.

SPECIFICATION forming part of Letters Patent No. 655,499, dated August 7, 1900.

Application filed May 9, 1899. Serial No. 716,075. (No specimens.)

*To all whom it may concern:*

Be it known that I, GEORGE C. LYMAN, a citizen of the United States of America, residing in the city, county, and State of New York, have invented certain new and useful improvements in the art of manufacturing copal compounds capable of use for insulating materials, for rubber substitutes, and a variety of other uses, of which the following is a specification.

The present invention is related to compounds containing copal or equivalent hard and difficultly-soluble resins. Copal is not readily soluble in alcohols or other familiar solvents in the cold state; but by the combination of heat and pressure part of the copal may be dissolved by acetone and another part by wood-spirit or methyl alcohol and the solution so combined may be mixed and diluted with propyl, butyl, isobutyl, amyl, or isoamyl alcohol, forming a solution or a pasty mass of the consistency desired, the evaporation of the more volatile solvents tending, of course, to gradually harden the pasty mass. Preferably the wood-spirit and the acetone will be used separately and successively and the other alcohols named will be subsequently added, though in the broader aspect of the invention this is not necessary. In the following description I will point out the procedure just as I prefer to employ it and will leave to the claims the enumeration of the novel features as I wish to claim them.

First of all the copal is preferably reduced to fine powder and dried at a temperature of 150° to 200° centigrade. The dried powder is then placed in a suitable chamber or vessel with an approximately-equal weight of wood-spirit. The vessel is then hermetically closed and is heated to a temperature of at least 100° centigrade. The contents should be constantly agitated to facilitate solution. The wood-spirit under the action of the heat creates a considerable pressure, but cannot escape by evaporation, owing to the vessel being closed. For hard grades of copal at least an hour is usually required to effect solution to the desired extent. After the solvent action of the wood-spirit is completed the vessel is preferably cooled and the liquid portion of the mixture, consisting of a solution of a part of the copal in the wood-spirit, is drawn off. To the undissolved remainder a quantity of acetone, about equal in weight, is added and the vessel again closed and heated, as before. Under this second treatment the rest of the copal is dissolved substantially completely. The vessel is then cooled and the acetone solution drawn off and mixed with the wood-spirit solution, thereby giving a substantially-complete solution of the copal in wood-spirit and acetone. The mixture may then be filtered and a quantity of the lower alcohols of fusel-oil, amounting to about one-tenth the weight of the copal, may be added, or I may employ any of the alcohols I have specifically named above either jointly or singly. The mass may be then heated, so as to drive off any desired portion of the more volatile solvents and reduce the mass to a stiff paste or to whatever consistency is wished. The mass or compound so produced is ready for further treatment in producing various useful articles. I will not set forth the further treatment which may be resorted to in manufacturing a variety of molded articles, as by incorporating various fibers or mineral substances with my plastic or base, but will confine this application to the art or process of producing such suitable copal plastic or base. The articles made of this plastic or base have remarkable electrical insulating properties. It is superior to hard rubber, being not only less combustible, but also less readily softened. Indeed, it softens only at temperatures far higher than that at which hard rubber becomes softened. It also resists the action of acids, of alkalies, of water, and of most solvents.

Leaving to the divisional application all claim to the compound itself, I claim as the novel and characteristic features of my improvement in the art the following:

1. The improvement in the art of manufacturing copal compounds, which consists in dissolving the copal in part by the aid of wood-alcohol, heat and pressure, substantially as set forth.

2. The improvement in the art of manufacturing copal compounds, which consists in dissolving the copal in part by the aid of acetone, heat and pressure, substantially as set forth.

3. The improvement in the art of manufacturing copal compounds, which consists in dissolving the copal in part by the aid of wood-alcohol and in part by the aid of acetone, substantially as set forth.

4. The improvement in the art of manufacturing copal compounds, which consists in dissolving the copal in part by the aid of wood-alcohol and heat, and in part, but separately, by the aid of acetone and heat, and subsequently mixing the solutions so produced, thereby producing a substantially-complete solution of the copal.

5. The improvement in the art of manufacturing copal compounds, which consists in first dissolving the copal in a relatively more volatile solvent, and then adding a relatively less volatile solvent, whereby the evaporation of part of the solvents shall leave a plastic mass.

In testimony whereof I have signed my name to this specification in the presence of two subscribing witnesses.

GEORGE C. LYMAN.

Witnesses:
H. B. KRETCHMER,
EDWIN SEGER.